United States Patent Office 3,196,026
Patented July 20, 1965

3,196,026
PROCESS FOR THE PRODUCTION OF NON-FOAMED, URETHANE-TYPE POLYMERS
Alfred J. Menard and Thomas H. Williams, both of Seattle, Wash., assignors to Timesaver Products Company, Seattle, Wash., a corporation of Washington
No Drawing. Filed May 9, 1961, Ser. No. 109,238
6 Claims. (Cl. 106—287)

This invention relates to non-foaming, urethane-type polymers and to methods for their production.

Urethane-type polymers conventionally are prepared by reacting a polyol with an organic isocyanate. Usually the polyol, e.g. a vegetable oil such as castor oil, is reacted with the organic isocyanate, e.g. toluene di-isocyanate, to form a prepolymer. The latter and additional quantities of the polyol are shipped in separate containers to the place of product manufacture. The prepolymer and polyol then are mixed in suitable proportions with a filler and a catalyst and reacted under predetermined reaction conditions to form the finished polymeric product.

Since the organic isocyanates are reactive with water, a significant side reaction leading to the conversion of the isocyanate to an amine and gaseous carbon dioxide may occur during the polymerizing reaction if water is present in the reaction mixture. The carbon dioxide apears in the form of bubbles which create a foamed polymeric product.

Advantage is taken of this side reaction if a foamed plastic product is desired. However, in some applications the presence of a foam is extremely disadvantageous. For example, the urethane-type polymers potentially are suited ideally for use as caulking sealants in such applications as the glazing of windows, since they are impervious, durable, flexible, and adhesive to glass, metal, masonry and wood. They also potentially are of wide application as encapsulating and potting materials used for sealing radios and other instruments used in aircraft, missiles, and submarine installations.

For such applications it is imperative that the polymers maintain their original "as cast" dimensions. This in turn necessitates that they be substantially non-foaming, a result which is difficult of achievement since the moisture necessary to react with the isocyanates to form carbon dioxide gas is present in substantial amounts in the raw materials of which the plastics are formed, unless previously removed by difficult and time-consuming processes.

Accordingly it is the general object of the present invention to provide non-foaming, dimensionally stable, urethane-type polymers of wide commercial application by methods which may be carried out with facility in conventional manufacturing procedures without the use of special equipment.

Broadly stated, the foregoing and other objects of the present invention are accomplished by reacting together a polyol and an organic isocyanate, usually in the presence of a catalyst and filler, and also in the presence of a dehydrating agent capable of reacting with any water which may be present in the reaction mixture and which otherwise would react with the isocyanate to liberate foam-producing carbon dioxide gas.

Soluble anhydrite is uniquely suited for such use. When it is used in amount sufficient to react with any free moisture which may be present, it does so instantaneously and with continuing efficiency before such moisture can react with the organic isocyanates, preventing adverse side reactions of this water with the isocyanates at the time of formulation and thereafter during use. As a result there are formed dimensionally stable, cast polymeric products useful as plastic sealants for windows and the like, as encapsulating materials, and in a diversity of other applications.

As has been indicated above, the polyol which is one of the essential constituents of the herein described polymeric compositions may be any diol, triol, or polyol containing two or more hydroxyl radicals in its molecule. Examples of suitable polyols thus are the various glycols including ethylene glycol, polyethylene glycol, propylene glycol, the polypropylene glycols, butylene glycol, the polybutylene glycols; glycerol and its derivatives; and particularly, the various glyceride vegetable oils such as castor oil, the structure of which is characterized by the presence of plural hydroxyl groups.

The organic isocyanate which comprises another of the essential constituents of the herein described polymeric compositions may comprise any isocyanate capable of forming polymers with polyols of the above identified categories. Because of their activity and the ease with which they enter into polymer formation, the di-isocyanates such as toluene di-isocyanate and diphenylmethane di-isocyanate are preferred. In commercial application, the isocyanate preferably is used as a prepolymer including predetermined proportions of the selected polyol.

When the polyol and organic isocyanate are mixed together, a polymerizing reaction occurs which, as is well known, is markedly accelerated by the addition of a minor proportion, e.g. from .1% to 5% by weight, based on the weight of the total mixture, of a suitable catalyst. Catalysts known to affect this reaction favorably comprise the amine catalysts such as morpholine, n-coco morpholine, dibutyl tin dilaurate, etc.

Suitable fillers also preferably are used in conjunction with the other constituents of the reaction mixture. These impart desired properties to the final products, including the prevention of slump, i.e. the prevention of sagging of the plastic product when it is used in vertical position. Suitable fillers comprise the various forms of calcium carbonate, asbestos, talc, lithopone, the various clays, wood flour and fiber, powdered metals such as aluminum and stainless steel, and various types of gelling compounds.

To remove water which may be present as an impurity in the foregoing materials a suitable dehydrating agent also is included in the reaction mixture. All dehydrating agents are not useful in this application, however, since several imporatnt criteria must be met.

First of all, keeping in mind that the organic isocyanates themselves are dehydrating agents having great affinity for water, it is necessary that the dehydrating agent be even more reactive toward water than are the organic isocyanates to insure that in the competitive reactions occurring in the reaction mixture, the dehydrating agent, rather than the organic isocyanate, will react with substantially all of the moisture which may be present.

Secondly, the dehydrating agent must not react in any adverse manner with the polyol, pre-polymer or organic isocyanate to produce side products which would affect detrimentally the properties of the intermediate or final polymeric products. For example, they must not affect adversely the pot life of the intermediates used in making the final applications.

Thirdly, they must react rapidly, efficiently, and permanently with the water so that a water-containing complex is not formed which, over a period of time, still might be reactive with the isocyanate to liberate gaseous carbon dioxide.

After an extensive investigation, we have found soluble anhydrite, or anhydrous calcium sulfate ($CaSO_4$) uniquely suitable for use as a desiccant in the compositions of the invention. It may be prepared by calcining either hydrated gypsum ($CaSO_4 \cdot \frac{1}{2}H_2O$) at relatively low temperatures ranging between about 390° F. and 595° F. At temperatures above about 595° F. a calcium sulfate phase is produced which has but little tendency to dehydrate and therefore is not well suited for use as a desiccant. The soluble anhydrite phase accordingly is the phase of calcium sulfate which is suitable for our purpose.

The amount of dehydrating agent to be employed is somewhat variable. In general, an amount must be used which is sufficient to provide at least the stoichiometric quantity required to react with the moisture present in the reaction mixture. The upper limit of use is determined by such practical considerations as the viscosity or flow properties desired in the reaction mixture as it is cast or molded, the physical properties of the set polymer, the efficiency and activity of the dehydrating agent, and the like.

The dehydrating agent may be added as a separate constituent, as a component of the prepolymer, as a component of the polyol, or as a component of the filler. In general, it serves per se as a filler in preventing sagging or slumping of the polymeric product. Hence it may be used to replace a certain proportion of that constituent.

Thus the constituents of polymeric compositions to which the present technique may be applied are as indicated in Table I, wherein sufficient of the indicated constituents are used to make a total of 100%.

TABLE I

| | Percent by weight |
|---|---|
| Organic isocyanate | 10–60 |
| Polyol | 10–60 |
| Pigment, including dehydrating agent | 0–60 |
| Catalyst | 0–5 |

Illustrative of our invention, and indicating the surprising lack of effectiveness of conventional dehydrating agents other than those stipulated herein to be suitable for our purpose are the procedures of the following example, in which parts are expressed as parts by weight.

*Example 1*

In this example, several reaction mixtures were formulated using different dehydrating agents. In each case 1 part of prepolymer, comprising the reaction product of substantially equal parts of castor oil and toluene di-isocyanate (Baker U-63) was reacted with 1 part of polyol comprising castor oil (Baker No. 53). All of these starting materials contained at least a small amount of moisture.

The dehydrating agent was calcined and used as 100% of the filler material in the prepolymer. It was included as part of the pigment component of the polyol as indicated below.

The polyol and pre-polymer mixtures were allowed to stand approximately 20 hours before combining. Approximately 1% of a morpholine catalyst (n-coco morpholine) also was included in the reaction mixture.

The mixture then was poured into a mold simulating in dimensions and configuration the frame of a window in which a glass pane was to be sealed. After it had set, the mold was inspected for foaming with the results given in Table II below.

TABLE II

| | Total Percent of Dehydrating Agent Present | Percent of dehydrating Agent in Prepolymer, by Weight | Percent of dehydrating Agent in Polyol, by Weight | Results |
|---|---|---|---|---|
| Alumina, $Al_2O_3$ | 27.5 | 40.0 | 20.0 | A |
| Silica gel, $SiO_2$ | 4.8 | 9.1 | 2.5 | A |
| Cupric Sulfate $CuSO_4$ (anhydrous) | 30.5 | 51.6 | 20.0 | A |
| Magnesium Sulfate $MgSO_4$ (anhydrous) | 34.1 | 55.0 | 20.0 | A |
| Portland Cement | 37.1 | 55.0 | 20.0 | A |
| Calcium Sulfate $CaSO_4$ (anhydrou-ignited) | 26.7 | 40.0 | 20.0 | A |
| Calcium Sulfate $CaSO_4$ (soluble anhydrite) | 26.7 | 40.0 | 20.0 | B |

A—Immediate expansion due to isocyanate reaction with free water, forming carbon dioxide foam.
B—No significant expansion or foaming.

It is apparent from the foregoing that the soluble anhydrite showed greatest dehydrating efficiency. Furthermore the individual polyol and prepolymer components in which it was contained had excellent storage life. The pot life of the combined components was from 3½ to 4 hours before the occurrence of excessive polymerization preventing normal effective use.

Although they are well known dehydrating agents, the remaining six reagents proved to be totally inapplicable for the present purpose. Alumina and silica gel proved to be inapplicable because the water they absorbed was still available for reaction with the isocyanate groups of the prepolymer when they were incorporated permanently in the polymer mixture.

Cupric sulfate, magnesium sulfate and Portland cement were inapplicable, presumably because their rates of reaction with free water were too slow as compared with the rate of reaction of the isocyanate component of the prepolymer with free water, or because of their inability to tie up the water effectively.

Calcium sulfate (anhydrous, ignited for two hours at 1800° F.) showed but little tendency to react with water.

Thus it will be apparent that by the present invention we have provided non-foaming, urethane-type polymers useful in a wide variety of applications, particularly as caulking sealants for use in sealing window sash, and as encapsulating materials for use in sealing instruments to protect them from adverse environmental influences. These polymers are provided, moreover, by reactions which do not require the presence of prohibitively costly components and may be prepared in conventional equipment using procedures which are well suited for practical commercial application.

Having thus described our invention in preferred embodiments, we claim and desire to protect by Letters Patent

1. The process of making a non-foamed polymeric urethane product from moist materials which comprises reacting together the reactive constituents of a mixture comprising:
   (a) a polyol
   (b) an organic isocyanate
   (c) a urethane-promoting catalyst
   (d) a filler, and
   (e) soluble anhydrite used in at least the stoichiometric amount required to react with substantially all of the water present in the mixture,
   (f) the anhydrite being present in the mixture during the occurrence of the reaction between the polyol and the isocyanate, and remaining in the resulting polymeric urethane product as a component thereof.

2. The process of claim 1 wherein the organic isocyanate is an alkyl isocyanate.

3. The process of claim 1 wherein the polyol is a glyceride vegetable oil and the organic isocyanate is an alkyl isocyanate.

4. The process of claim 1 wherein the polyol is castor oil and the organic isocyanate toluene is di-isocyanate.

5. The process of claim 1 wherein the constituents of the reaction mixture are used in the following proportions, to a total of 100%:

| | Percent by weight |
|---|---|
| Polyol | 10–60 |
| Organic isocyanate | 10–60 |
| Filler, including the soluble anhydrite | 5–60 |
| Urethane promoting catalyst | 0.1–5 |

6. The process of claim 5 wherein the polyol is castor oil and the organic isocyanate is toluene diisocyanate.

References Cited by the Examiner

UNITED STATES PATENTS

| | | | |
|---|---|---|---|
| 2,650,212 | 8/53 | Windemuth | 260—77.5 |
| 3,006,884 | 10/61 | Phillips | 260—77.5 |
| 3,010,940 | 11/61 | Charlton et al. | 260—37 |
| 3,074,911 | 1/63 | Harper | 260—77.5 |

OTHER REFERENCES

A Comprehensive Treatise on Inorganic and Theoretical Chemistry, Mellor, vol. 3, page 763, 1923.

The Merck Index, Seventh Edition, page 198, 1960.

Rubber Chem. and Tech., Bayer et al., October-December 1950, page 823.

Semimicro Qualitative Organic Analysis, Cheronis et al., Second Edition, 1957, page 734.

MORRIS LIEBMAN, *Primary Examiner.*

JOHN H. MACK, ALEXANDER H. BRODMERKEL, *Examiners.*